United States Patent [19]

Bennett

[11] Patent Number: 5,295,563
[45] Date of Patent: Mar. 22, 1994

[54] ACTIVE SUSPENSION ACTUATOR WITH CONTROL FLOW THROUGH THE PISTON ROD

[75] Inventor: Jack C. Bennett, Ann Arbor, Mich.

[73] Assignee: General Motors Corporation, Detroit, Mich.

[21] Appl. No.: 24,053

[22] Filed: Mar. 1, 1993

[51] Int. Cl.⁵ .......................... F16F 9/46; B60G 17/00
[52] U.S. Cl. ..................................... 188/299; 188/315; 188/318; 267/64.26; 280/707
[58] Field of Search ............... 188/281, 282, 285, 299, 188/315, 318, 319, 322.13, 322.19, 314; 267/64.25, 64.26, 64.28; 280/707, 709

[56] References Cited

U.S. PATENT DOCUMENTS

| | | |
|---|---|---|
| 4,614,255 | 9/1986 | Morita et al. |
| 4,720,085 | 1/1988 | Shinbori et al. ............. 267/64.26 X |
| 4,746,106 | 5/1988 | Fukumura ..................... 280/707 X |
| 4,749,070 | 6/1988 | Moser et al. ........................ 188/299 |
| 4,828,230 | 5/1989 | Steger et al. ................. 267/64.26 X |
| 4,880,086 | 11/1989 | Knecht et al. ................. 188/315 X |
| 4,900,056 | 2/1990 | Fukushima et al. ................ 280/708 |
| 4,972,928 | 11/1990 | Sirven ................................ 188/269 |
| 4,979,595 | 12/1990 | Paton .................................. 188/129 |
| 4,993,693 | 2/1991 | Löhr et al. ....................... 267/64.17 |
| 5,027,927 | 7/1991 | Bacardit ............................... 188/299 |
| 5,080,205 | 1/1992 | Miller et al. ................... 188/319 X |
| 5,207,301 | 5/1993 | Kruckemeyer et al. ....... 188/318 X |

FOREIGN PATENT DOCUMENTS

| | | | |
|---|---|---|---|
| 572395 | 1/1958 | Italy ................... 280/709 |
| 798811 | 7/1958 | United Kingdom ............. 267/64.25 |

*Primary Examiner*—Andres Kashnikow
*Assistant Examiner*—Kevin D. Rutherford
*Attorney, Agent, or Firm*—A. Michael Tucker

[57] ABSTRACT

The present actuator includes an inner cylinder closed at one end by an end cap and concentrically mounted in a reservoir tube. A fluid reservoir is formed between the inner cylinder and the reservoir tube. A piston is slidably mounted in the Y inner cylinder, dividing an interior volume of the inner cylinder into first and second chambers. A hollow piston rod is secured at its lower end to the piston and extends beyond the inner cylinder. A separator tube is mounted on the end cap and extends through the piston and into the piston rod to provide a fluid conduit from the reservoir to an external source of controlled pressurized fluid.

13 Claims, 2 Drawing Sheets

ACTIVE SUSPENSION ACTUATOR WITH CONTROL FLOW THROUGH THE PISTON ROD

BACKGROUND OF THE INVENTION

1. Field of the Invention

The present invention relates generally to vehicular suspension systems, and in particular is concerned with an active suspension single-acting hydraulic actuator with damping capabilities.

2. Description of the Related Art

Many active vehicular suspension systems include a hydraulic actuator to selectively vary the distance between a wheel assembly and a body. When a road input is received to the wheel assembly, the actuator compresses. When the road input is removed, the actuator rebounds or extends. Fluid from a control source such as a pressurized reservoir accepts fluid from and returns fluid to the actuator. The rate of compression and rebound of the actuator can be controlled to provide a desired rate of damping.

SUMMARY OF THE INVENTION

The present invention includes a hydraulic actuator for a vehicular suspension system. The actuator includes a damping control valve to provide a desired rate of damping. Fluid flow between the actuator and a pressurized source of fluid is routed through a hollow piston rod of the actuator. A separator tube is slidably received in the piston rod and provides direct fluid communication between the pressurized source of fluid and a reservoir in the actuator, thereby allowing damping control in both compression and rebound strokes of the actuator. The routing of fluid through the piston rod provides a desirable packaging benefit for the actuator.

A preferred embodiment of the present actuator includes an inner cylinder closed at one end by an end cap and concentrically mounted in a reservoir tube. A fluid reservoir is formed between the inner cylinder and the reservoir tube. A piston is slidably mounted in the inner cylinder, dividing an interior volume of the inner cylinder into first and second chambers. A hollow piston rod is secured at its lower end to the piston and extends beyond the inner cylinder. A separator tube is mounted on the end cap and extends through the piston and into the piston rod to provide a fluid conduit from the reservoir to an external source of controlled pressurized fluid.

DETAILED DESCRIPTION OF THE PREFERRED EMBODIMENT

Figure 1:
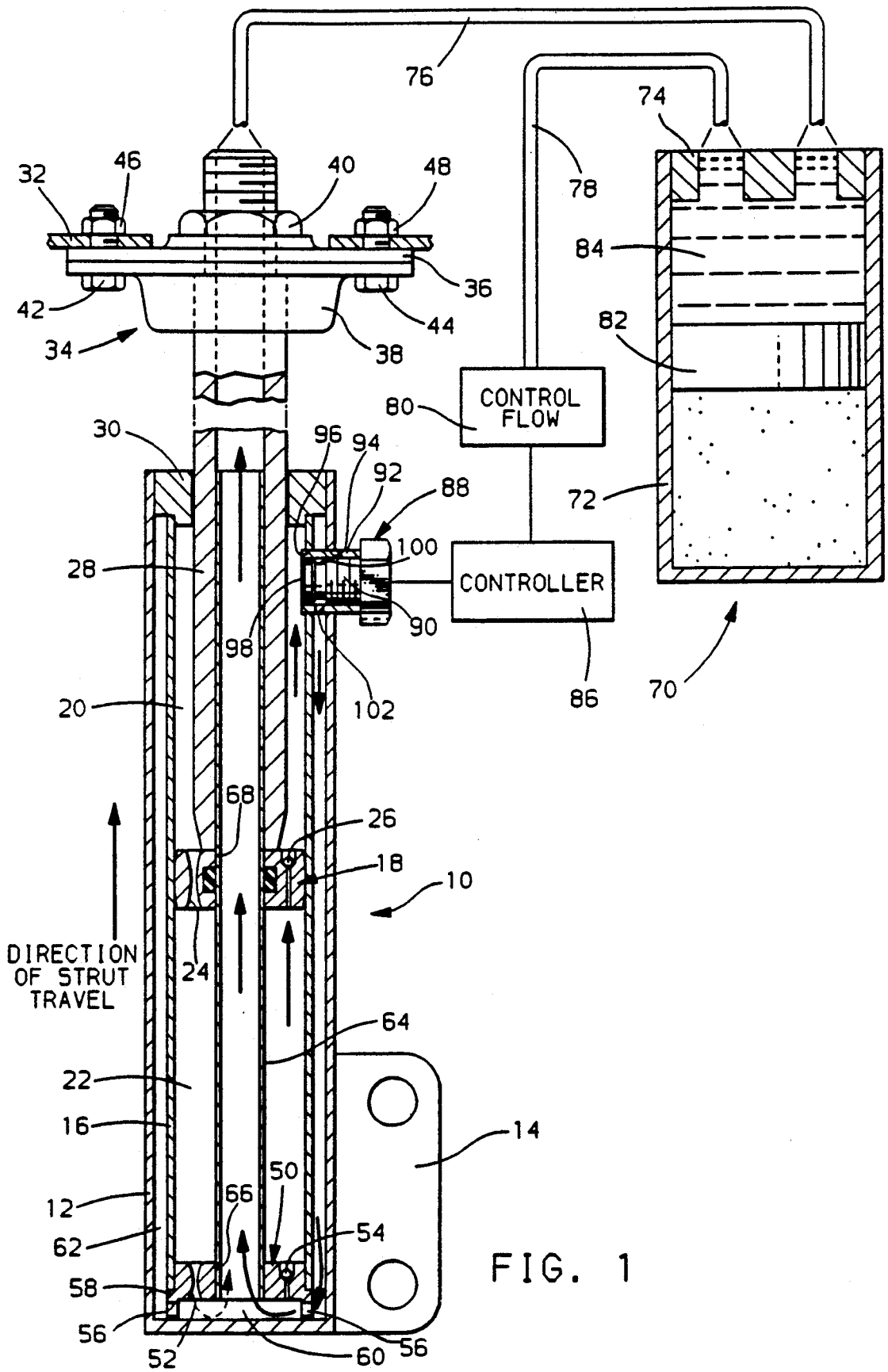
FIG. 1 is a longitudinal sectional view through a preferred embodiment of the present actuator connected to a fluid source through an accumulator illustrating fluid flow during a compression stroke when a damping control valve is energized.

A hydraulic actuator for vehicular suspensions is indicated generally at 10 and schematically illustrated as a strut in FIG. 1. The actuator 10 includes a reservoir tube 12 closed at its lower end. The reservoir tube 12 is mounted to a wheel assembly (not illustrated) through a bracket 14 mounted on the reservoir tube 12 in a well-known manner.

An inner cylinder 16 is concentrically mounted within the reservoir tube 12. A piston 18 is slidably mounted in the inner cylinder 16 and divides an interior volume of the inner cylinder 16 into an upper chamber 20 and a lower chamber 22. The piston 18 includes rebound valving schematically illustrated as a restrictive throttle valve 24 and a check valve 26. An inner end of a hollow piston rod 28 is secured to the piston 18. The piston rod 28 projects upwardly through a rod guide 30 which closes the upper ends of the inner cylinder 16 and the reservoir tube 12. Various seals (not illustrated) can be provided at the rod guide 30 to prevent fluid loss from the upper chamber 20 and the reservoir tube 12.

The piston rod 28 is mounted to support structure 32 of a vehicle by a mounting assembly 34. The mounting assembly 34 includes a mounting plate 36 and cover 38 which preferably house elastomeric isolators (not illustrated) in contact with the piston rod 28. A nut 40 threaded onto the upper end of the piston rod 28 secures the mounting assembly 34 and its isolators onto the piston rod 28. Bolts 42, 44 and respective nuts 46, 48 can be used to secure the plates 36, 38 to the support structure 32.

A lower end of the inner cylinder 16 is closed by an end cap 50 having compression valving schematically illustrated as a restrictive throttle valve 52 and a check valve 54. A plurality of radial ports 56 in an annular flange 58 of the end cap 50 provide fluid communication between a chamber 60 below the end cap 50 and a fluid reservoir 62 formed between the inner cylinder 16 and the reservoir tube 12.

A separator tube 64 is mounted in a central opening 66 of the end cap 50 and projects upwardly into a central opening 68 of the piston 18 and into the piston rod 28. The separator tube 64 is of sufficient length to accommodate the entire stroking range of the piston 18 in the inner cylinder 16.

The separator tube 64 provides fluid communication between chamber 60 and an accumulator illustrated as a gas spring 70 to provide compliance in the actuator 10. The gas spring 70 includes a tubular housing 72 closed at its lower end. An end cap 74 closes the upper end of the gas spring 70. A first conduit 76 having suitable fittings (not illustrated) is connected between the upper end of the piston rod 28 and the end cap 74. A second conduit 78 is connected by suitable fittings (not illustrated) to the end cap 74 and a controlled source of pressurized fluid which can include appropriate pumps and valves, illustrated as control flow 80 in FIG. 1. A piston 82 reciprocates in the housing 72 to compensate for the addition and deletion of fluid in a fluid chamber 84 in a well-known manner during operation of the actuator 10. As used in this description, control flow 80 means any flow to or from the actuator 10

Fluid is introduced to the actuator 10 from the gas spring 70 to extend the length of the actuator 10. To shorten the actuator 10, fluid is received by the gas spring 70 from the actuator 10. A controller 86 directs the control flow 80 to achieve the desired length of the actuator 10.

A damping control valve 88 controls the damping rate of the actuator 10. The control valve 88 preferably includes a fast-acting valve element, most preferably an electromechanical valve element actuated by the controller 86. The control valve 88 includes a housing 90 threaded into a valve boss 92 mounted in respective openings 94, 96 of the inner cylinder 16 and the reservoir tube 12. An inlet portion 98 of the control valve 88 is in fluid communication with the upper chamber 20. An internal passage (not illustrated) in the control valve 88 directs fluid to an outlet portion 100 in fluid communication with the reservoir 62 via ports 102 in the valve boss 92. The control valve 88 can be of any suitable type, including an off/on valve or a continuously variable valve.

Four damping modes of operation are available for the actuator 10. For purposes of this specification, the operation of the actuator 10 will be described using a normally-closed control valve 88, resulting in relatively more restrictive fluid flow inside the actuator 10 and firm damping. When the control valve 88 is energized, and thus open, fluid flows through the less restrictive control valve 88 to provide soft damping. It is appreciated that a normally-open control valve can be utilized with the actuator 10 to provide soft damping until the valve is energized, resulting in firm damping. Also, as stated above, the control valve 88 can be continuously variable to provide selective damping.

During compression of the actuator 10, i.e., when the reservoir tube 12, inner cylinder 16, end cap 50 and separator tube 64 move upwardly with respect to the piston 18 and piston tube 28 due to a road input, a low level of damping is provided when the damping control valve 88 is energized, thereby permitting fluid in the upper chamber 20 to pass to the reservoir 62 through the control valve 88. Fluid from the lower chamber 22 travels through the piston valving 24, 26 to reach the upper chamber 20. Simultaneously, fluid from the reservoir 62 travels through chamber 60 and the separator tube 64 to the gas spring 70 to compensate for the piston rod 28 entering the inner cylinder 16. Fluid flows through the relatively less restricted control valve 88 to provide low or "soft" damping during the compression stroke.

Figure 2:
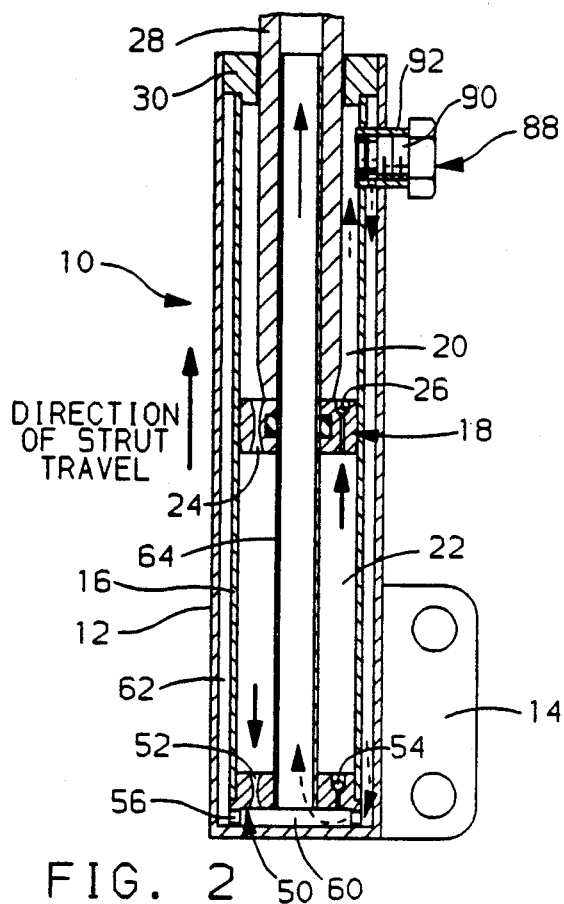
FIG. 2 is a sectional view of the actuator of FIG. 1 illustrating fluid flow during a compression stroke when the damping control valve is not energized.

When the control valve 88 is not energized during a compression stroke, fluid in the lower chamber 22 flows to the upper chamber 20 through check valve 26 and to chamber 60 through the restrictive compression throttle valve 52 as illustrated in FIG. 2. The actuator 10 provides a high or "firm" damping during the compression stroke when the control valve 88 is not energized.

Figure 3:
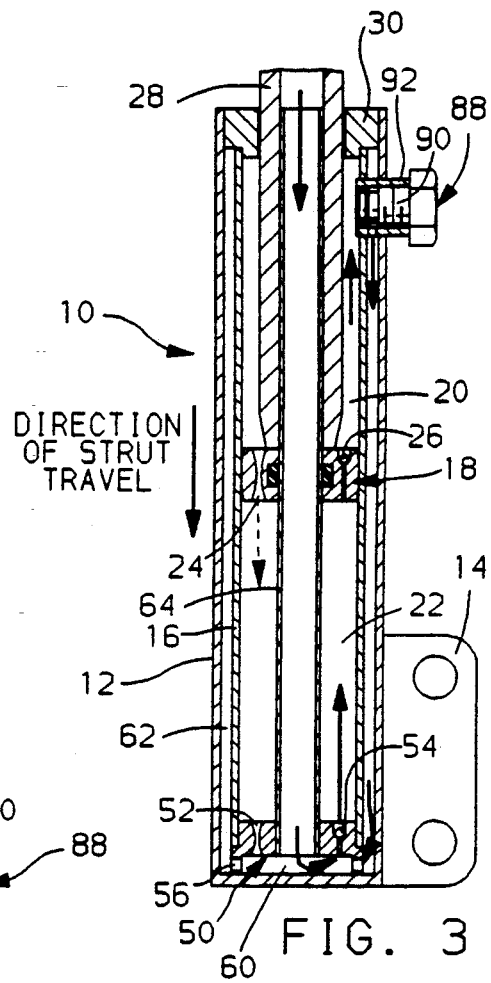
FIG. 3 is a sectional view of the actuator of FIG. 1 illustrating fluid flow during a rebound stroke when the damping control valve is energized.

During a rebound or extension stroke, i.e., when the reservoir tube 12, inner cylinder 16, end cap 50 and separator tube 64 move downwardly from the piston 18 and piston rod 28, a low level of damping is provided when the control valve 88 is energized, as illustrated in FIG. 3. As the piston rod 28 exits the inner cylinder 16, fluid from the gas spring 70 enters the separator tube 64 and fills the lower chamber 22 through check valve 54. Also, fluid from the upper chamber 20 passes through the control valve 88 and the reservoir 62 to reach the lower chamber 22. This mode of operation provides a low or "soft" rate of damping during the rebound stroke.

Figure 4:
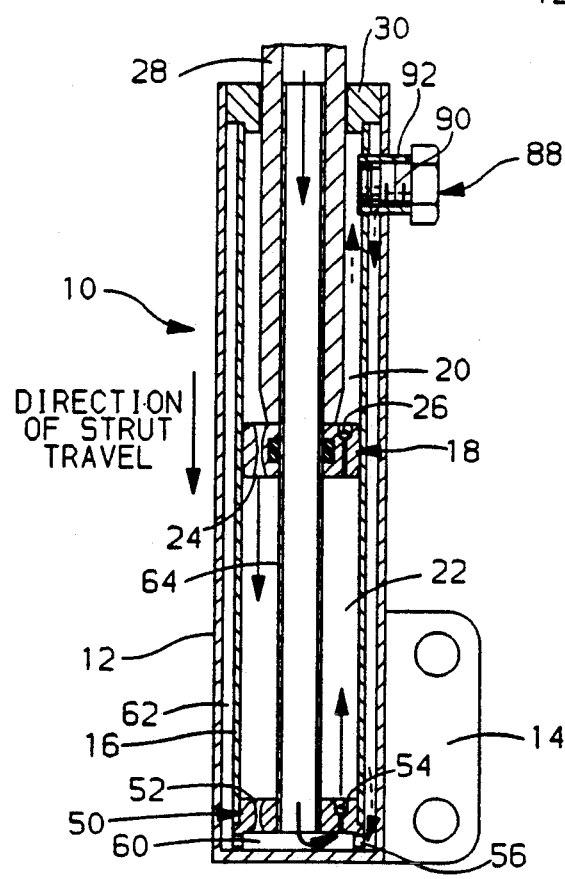
FIG. 4 is a sectional view of the actuator of FIG. 1 illustrating fluid flow during a rebound stroke when the damping control valve is not energized.

When the control valve 88 is not energized during a rebound stroke, as illustrated in FIG. 4, the actuator 10 provides a high or "firm" rate of damping. Fluid in the upper chamber 20 passes through the throttle valve 24 of the piston 18 to the lower chamber 22. Fluid from the gas spring 70 passes through the separator tube 64 and check valve 54 to the lower chamber 22.

The present separator tube 64 permits fluid to be introduced to the actuator 10 through the piston rod 28. Fluid introduced to the actuator 10 is routed directly to chamber 60 and is not immediately introduced in the upper or lower chambers 20, 22. Thus, only one valve, control valve 88, can provide selected damping during both compression and extension of the actuator 10. Furthermore, the introduction and removal of fluid from the piston rod 28 provides a desirable packaging benefit for the actuator 10.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An active suspension hydraulic actuator comprising:
    (a) a reservoir tube closed at a first end;
    (b) an inner cylinder concentrically mounted in the reservoir tube;
    (c) a fluid reservoir formed between the inner cylinder and the reservoir tube;
    (d) end cap means closing a first end of the inner cylinder;
    (e) a piston, slidably mounted in the inner cylinder, dividing an interior of the inner cylinder into first and second chambers;
    (f) a hollow piston rod secured at an inner end to the piston and projecting through a second end of the inner cylinder;
    (g) a separator tube mounted on the end cap means and extending through the piston and into the piston rod, providing a fluid conduit from a chamber adjacent the end cap means and in communication with the reservoir to the hollow piston rod; and
    (h) a damping control valve mounted on the actuator providing a selectively controllable fluid passage from the first chamber of the inner cylinder to the reservoir.

2. The actuator specified in claim 1 wherein the control valve is an electromechanical valve.

3. The actuator specified in claim 1 wherein a gas spring is hydraulically connected to the outer end of the piston rod.

4. The actuator specified in claim 1 including piston valving means to control fluid flow between the first and second chambers as the piston reciprocates.

5. The actuator specified in claim 1 including valving means in the end cap means to control fluid flow between the second chamber and the reservoir.

6. A vehicular suspension system comprising:
    (a) a twin-tube hydraulic actuator having an inner cylinder mounted in a reservoir tube, a piston and hollow piston rod reciprocally mounted in the inner cylinder, a fluid reservoir, and a separator tube providing a fluid communication between the reservoir and the piston rod;

(b) a damping control valve mounted on the reservoir tube for selectively providing variable damping;

(c) a controlled flow of hydraulic fluid connected to the piston rod; and (d) control means for controlling the flow of fluid to and from the piston rod and the operation of the damping control valve.

7. The system specified in claim 6 including a fluid accumulator connected between the piston rod and the controlled flow.

8. The suspension system specified in claim 6 including piston valving means in the piston to control fluid flow inside the inner cylinder.

9. The suspension system specified in claim 6 wherein the damping control valve is an electromechanical valve.

10. The suspension system specified in claim 6 wherein the inner cylinder is closed by an end cap mounting the separator tube.

11. The suspension system specified in claim 10 wherein the end cap includes valving means to control fluid between the inner cylinder and the reservoir.

12. The suspension system specified in claim 7 wherein the accumulator is a gas spring.

13. The suspension system specified in claim 7 wherein a first conduit provides fluid communication between the piston rod and the accumulator and a second conduit provides fluid communication between the accumulator and the controlled flow.

* * * * *